(12) United States Patent
Bailey et al.

(10) Patent No.: US 6,731,201 B1
(45) Date of Patent: May 4, 2004

(54) COMMUNICATIONS MODULE AND SYSTEM

(75) Inventors: Graham Bailey, Rheinland-Pfalz (DE); John Sharood, Richmond, VA (US)

(73) Assignee: Robert Shaw Controls Company, Richmond, VA (US)

(*) Notice: Subject to any disclaimer, the term of this patent is extended or adjusted under 35 U.S.C. 154(b) by 0 days.

(21) Appl. No.: 09/511,313

(22) Filed: Feb. 23, 2000

(51) Int. Cl.$^7$ .............................................. H04M 11/04
(52) U.S. Cl. ........................... 340/310.01; 340/310.02; 340/310.06
(58) Field of Search ................... 340/310.01, 310.02, 340/310.03, 310.04, 310.05, 310.06, 310.07, 310.08; 375/259

(56) References Cited

U.S. PATENT DOCUMENTS

| | | | | |
|---|---|---|---|---|
| 5,051,720 A | * | 9/1991 | Kittirutsunetorn | 340/310.02 |
| 5,086,385 A | * | 2/1992 | Launey et al. | 700/83 |
| 5,101,191 A | * | 3/1992 | MacFadyen et al. | 340/310.01 |
| 5,335,276 A | | 8/1994 | Thompson et al. | 380/21 |
| 5,452,344 A | * | 9/1995 | Larson | 340/310.01 |
| 5,491,463 A | * | 2/1996 | Sargeant et al. | 340/310.01 |
| 5,684,826 A | * | 11/1997 | Ratner | 375/222 |
| 5,938,757 A | | 8/1999 | Bertsch | 712/36 |
| 6,005,476 A | | 12/1999 | Valiulis | 340/310.01 |
| 6,441,723 B1 | * | 8/2002 | Mansfield et al. | 340/310.01 |

FOREIGN PATENT DOCUMENTS

| | | |
|---|---|---|
| EP | 0 687 794 | 12/1995 |
| EP | 0 893 745 | 1/1999 |
| WO | WO 99/65219 | 12/1999 |
| WO | WO 01/15300 | 3/2001 |

* cited by examiner

Primary Examiner—Donnie L. Crosland
(74) Attorney, Agent, or Firm—Fish & Richardson P.C.

(57) ABSTRACT

A communications module adapted to be received by an appliance having an appliance controller is provided. The module includes a communications protocol translator. The communications protocol translator translates signals received from a communications media into appliance controller signals. The translator also translates appliance control signals received from the appliance controller into a communications protocol to be output to an appliance communications network. A network ready appliance is also provided. The appliance includes an appliance controller having a communications port. The appliance also includes a cavity, defined by a plurality of walls, adapted to receive a communications module. An opening in a wall of the appliance allows access to the cavity. A connector is attached to one of the plurality of cavity walls. A communications line connecting the communications port and the connector is also provided. The connector is electrically coupled to the appliance controller or main power supply.

19 Claims, 11 Drawing Sheets

FIG. 4C ns Module and System

TECHNICAL FIELD

This invention generally relates to network ready appliances, and more particularly to a communications module and system for networked appliances.

BACKGROUND

Many conventional home and commercial appliances include an appliance controller such as a processor, providing automated operation of the appliance. Appliances having appliance controllers can be connected to a network to allow monitoring and remote or coordinated control of the appliances. Conventional appliance networks include one or more appliances connected to a host/server via a communications media. The host/server may be a computer, microcomputer, or other processor, that monitors the appliances and gathers data from the appliances. In addition, the host may control the functions of the appliances by sending commands to the appliance controllers. The host can also communicate with remote locations via a connection to an external communications network, such as the internet, thereby providing remote access and control of the appliances. Alternatively, the host could be a gateway allowing the appliances to be monitored and controlled by a host computer at a remote location.

However, before an appliance can be connected to a communications network, a communications device, for example, a communications board or card, must be connected with the appliance controller. The communications device allows communication between the appliance controller and a local or remote network. The communication device is typically installed by the manufacturer at the time of the appliance's production. Although connection of a communications device to the appliance controller allows the controller to be connected to a network, it is often undesirable for the manufacturer to include a communications device for a number of reasons.

First, although the communications device can be installed in the appliance by the manufacturer at the time the appliance is produced, the communications device significantly raises the cost of the appliance. Second, the communications device only allows connection with a predetermined communication media using predetermined communications protocol. Therefore, after the communications device has been installed in the appliance, the appliance may only be connected to the predetermined media. As a result, the appliance will not accommodate newer protocols or communications mediums that are later developed, or allow a change to a different communications medium, except at considerable expense. Therefore, the appliance may be doomed to obsolescence before the useful life of the appliance expires. Also, the cost associated with a manufacturer (or service provider) installing a newer communications device, in order to accommodate later developed protocols, often makes such updating economically impractical for many consumers and companies. Finally, replacing the communications device typically requires the services of a technician and therefore would not be considered consumer retrofit-friendly.

An alternative approach to including a communications device during manufacture of the appliance is to install the communications device after market. While this approach eliminates the cost of the communications equipment from the manufacturers overhead, it still requires a technician to install the communications device and therefore still incurs added expense to the purchaser. In addition, even if the manufacturer chooses not to include a communications module, an isolation device would have to be provided in the appliance to electrically isolate the appliance controller from the communications device to facilitate installation of the communications device. The isolation is usually provided by including a transformer or opto-electrical isolator between the appliance controller and the connection for the communications device. The isolator is an expensive component and therefore, some manufactures do not want to bear the cost associated with providing them.

SUMMARY

According to one aspect of the invention, the communications protocol and hardware are extracted from an appliance thereby eliminating the expense of this equipment from the appliance while allowing these elements to be easily installed after-market without the use of a skilled technician.

According to another aspect of the invention, the appliance is bus communication protocol and communications media agnostic. According to this aspect of the invention, the appliance can be adapted to any bus communications protocol or communications media. As a result, appliances can be retrofitted or updated to include currently undeveloped protocols to be used with the appliance and allow for easy switching of protocols and media thereby providing extremely flexible installation and connection of the appliance to a network.

Yet another aspect of the invention allows manufactures to provide network ready appliances without significantly adding to the overall cost of manufacturing the appliance.

A further aspect of the invention is to provide the communications protocol/hardware without the need for expensive isolation of the protocol/hardware in a manner that is safe for consumer installation and meets or exceeds government safety and liability standards.

According to an exemplary embodiment of the invention the foregoing and other aspects are accomplished through implementation of a communications module and network ready appliance. According to an exemplary embodiment, a communications module adapted to be received by an appliance having an appliance controller is provided. The module includes a communications protocol translator. The communications protocol translator translates signals received from a communications media into appliance controller signals. The translator also translates appliance control signals received from the appliance controller into a communications protocol to be output to an appliance communications network. The communications module may also include a power line transceiver connected to the communications protocol translator and a power line driver. The module couples to a connector provided in the appliance. The module connector is electrically coupled to the appliance power supply.

According to another aspect, the communications module includes a modem or and RF transceiver for connecting with an appliance network.

According to yet another aspect a network ready appliance is provided. The appliance includes an appliance controller having a communications port. The appliance also includes a cavity, defined by a plurality of walls, adapted to receive a communications module. An opening in a wall of the appliance allows access to the cavity. A connector is attached one of the plurality of cavity walls. A communications line connects the communications port and the connector. The connector is also electrically coupled to the appliance power supply.

The network ready appliance further includes a detachable cover provided over the opening. The detachable cover is attached to a wall of the appliance and is outlined by one of perforations or scoring allowing the cover to be detached from the wall by breaking the cover away from the wall.

According to yet another aspect of the invention, the appliance connector can be recessed in a cavity to provide additional protection against user shock. The recessed cavity can be provided in an outer wall of the appliance allowing the module to be surface mounted. Alternatively, the recessed connector can be provided in the cavity adapted to receive the communications module. According to this embodiment, a cover plate could be made optional as the recessed cavity provided protection against user shock.

DESCRIPTION OF DRAWINGS

The foregoing and other features, objects, and advantages of the invention will be better understood by reading the following description in conjunction with the drawings, in which.

DETAILED DESCRIPTION

The various features of the invention will now be described with respect to the figures, in which like parts are identified with the same reference characters.

System Overview

Figure 1A:
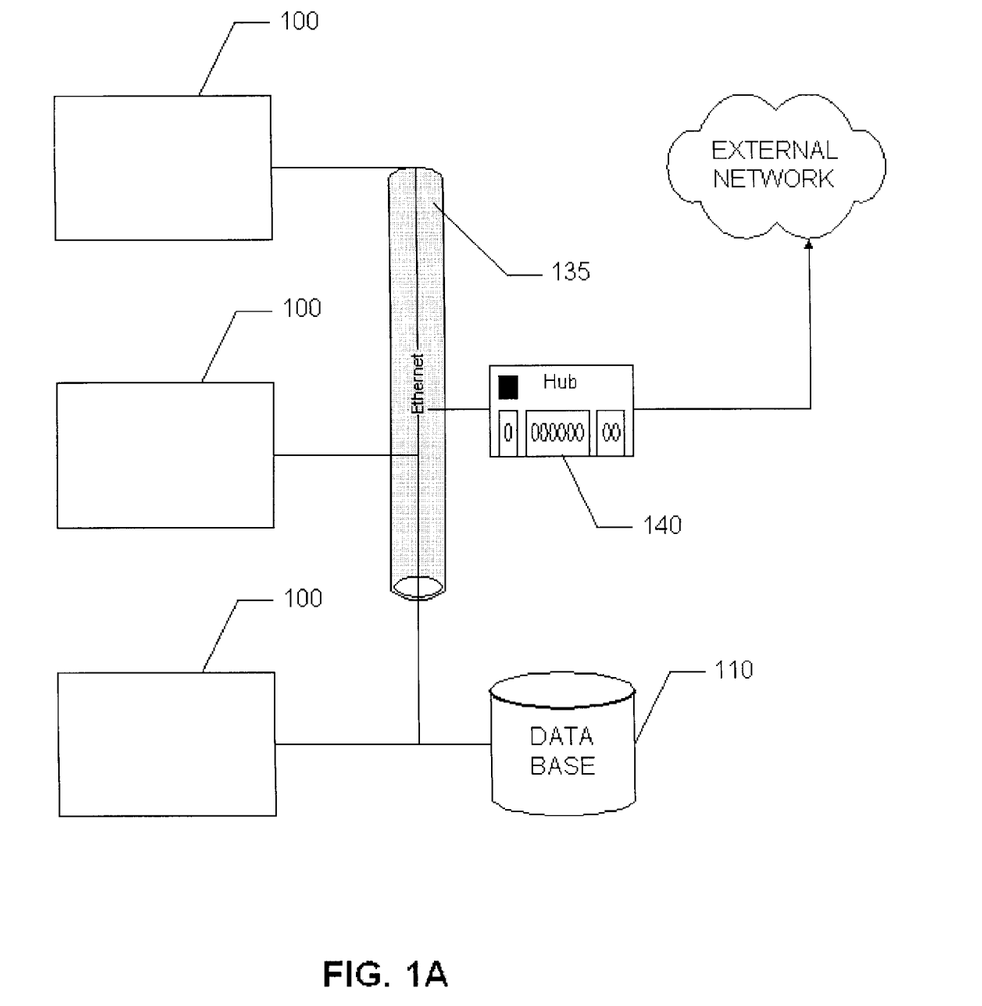
FIGS. 1A–1C show an exemplary block diagram of appliance local area network.

Turning to FIG. 1A, an exemplary network is shown including a number of appliances 100. The appliances 100 may be either commercial or home appliances. Examples of appliances include, but are not limited to, refrigerators, freezers, ovens, ranges, dishwashers, washer/dryers, microwaves, thermostats, trash compactors, heating/air-conditioning systems, etc. Although FIG. 1A shows three appliances 100, this number is purely exemplary. One skilled in the art will appreciate that any number of appliances can be included in the network and that the number of appliances is a design consideration based on the typed of network used. As shown in FIG. 1A, the appliances 100 are configured in a network using an Ethernet 135 network. However, any type of network such as, inter alia, a LAN, WAN, token, star can be used. One or more databases 110 can also be provided for storing data gathered from monitoring the appliances 100.

A host/server 140 is also connected to the network. The host 140 may be a computer microcomputer or processor that monitors the appliances 100 and gathers data from the appliances 100 for storage in the associated database 110. Alternatively, the host 140 can be replaced by a gateway connecting a remote host (not shown) to the appliance network allowing the remote host to monitor and control the appliances 100. In addition, the host 140 may also control the functions of the appliances 100 to provide optimal performance of the appliances 100. For example, the host 140 may send commands to control an appliance to compensate for local conditions at the appliance, such as temperature. The host 140 can also communicate with other remote locations through connection to an external communications network 120, such as the internet, providing for further remote access and control of the appliances 100.

Figure 1B:
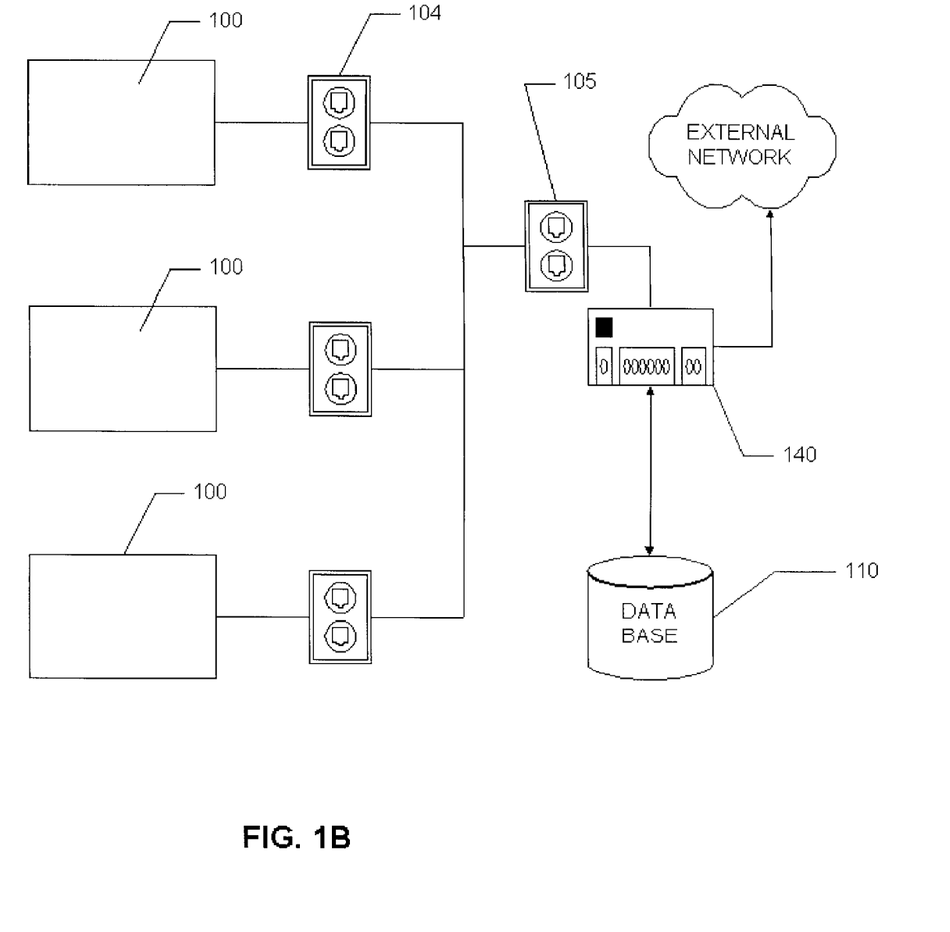
Figure 1C:
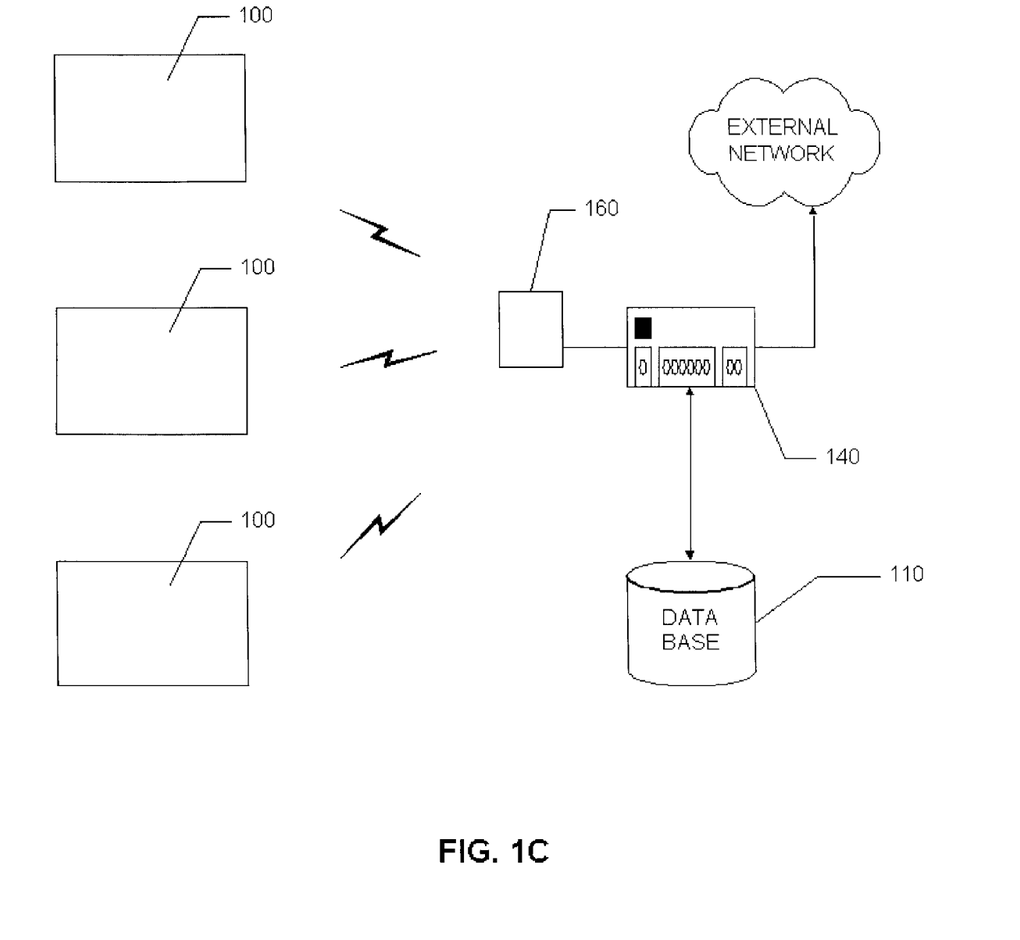

FIGS. 1B and 1C illustrate other network configurations that may be used to connect the appliances 100 to the host 140. As shown in FIG. 1B, a power line carrier (PLC) network can be used to send data between the appliance and the host 140. In this exemplary embodiment, the appliances 100 are connected to outlets 104. In addition, the host 140 is also connected to an outlet 105. The host 140 and appliances 100 communicate by sending PLC coded signals on the power lines connected between outlets 104 and 104 (as described in further detail with regard to FIGS. 2 and 3A. FIG. 1C shows a configuration in which wireless RF signals are used to exchange data between the appliances 100 and the RF transceiver 160 connected to the host 140.

Network Ready Appliances

Figure 2:
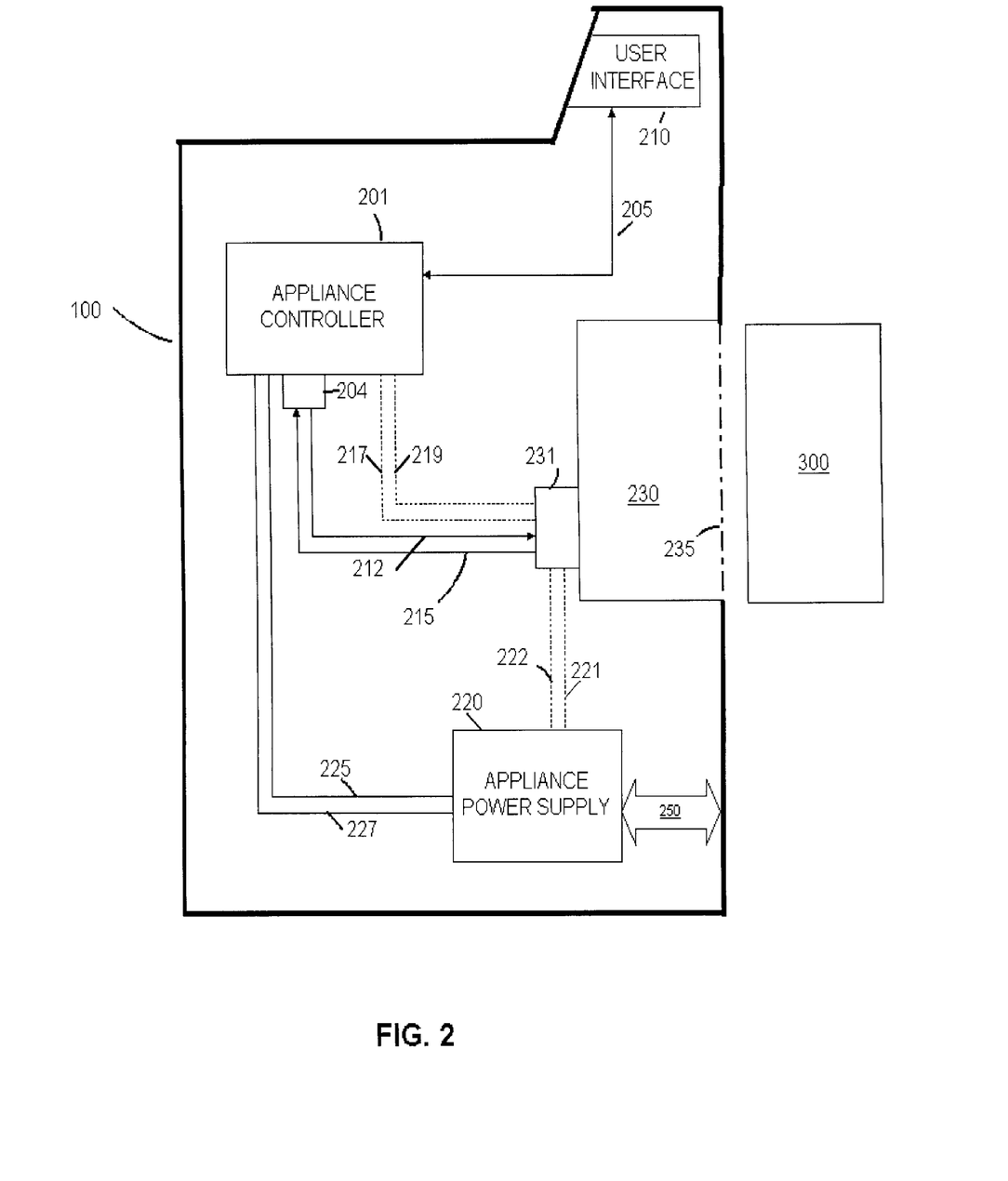
FIG. 2 shows an exemplary block diagram of network ready appliance.

Turning to FIG. 2, an exemplary network ready appliance 100 is shown. The appliance 100 includes an appliance controller 201. The appliance controller 201 can be implemented using a circuit board or integrated circuit. For example, the appliance controller 201 could be one of an application specific integrated circuit (ASIC), a digital signal processor (DSP), a microcomputer, a microprocessor, or other processor.

The appliance controller 201 can be connected to a user interface 210 via a communications link 205. The user interface 210 may include a display and user input device allowing an appliance operator to send and receive signals to and from the appliance controller 201 to control the appliance 100. The appliance controller 201 is also provided with a communications port 204, for example, an RS-232C serial port. Of course, one skilled in the art will appreciate that other types of communications ports could be used in place of, or in addition to, the serial port 204.

According to one exemplary embodiment, the appliance controller 201 also includes a memory. A communications protocol may be stored in the memory of the appliance controller 201 allowing the appliance controller 201 to communicate using the communications port 204. For example, universal asynchronous receive and transmit (UART) software could be provided in the memory for execution by the appliance controller to allow signals to be sent and received on the appliance controller's serial port 204.

The appliance 100 also includes a power supply 220 connected to a power feed 250 for connection to a power outlet 104 near the appliance 100, for example. The power supply 220 provides power to the various components in the appliance 100 including the appliance controller 201 (via line 225 and 227).

The appliance 100 also has a cavity 230 adapted to receive a communication module 300 (described in further detail with reference to FIGS. 3A–C). Although the cavity 230 is shown as recessed into the appliance 100, the cavity 230 could also be formed on the exterior of the appliance 100 by including a housing (not shown) adapted to receive the communications module 300. Alternatively, the module 300 could also be surface mounted on a wall of the appliance 100 (as shown, for example, in FIGS. 4A–4C).

A connector 231 is provided in a wall of the cavity 230. The connector 231 includes a communications port which maybe the same type as the communications port 204 provided on the appliance controller 201. According to an exemplary embodiment, the connector 231 includes a serial port, such as an RS-232C connector. Alternatively, the connector 231 can include one of the RJ family of connectors, such as an RJ-11 or RJ-45 connector, for example. Additional embodiments of the connector 231 are described with reference to FIGS. 4A–4C. The connector 231 is connected to the appliance controller 201 by a serial cable including lines 212 (receive) and 215 (transmit). As shown in FIG. 2, the connector 231 may also be electrically coupled to the appliance controller 201 or to the appliance power supply 220. In other words, the connector 231 is not isolated from the appliance controller 201. As a result, the serial cable and connector can be installed by the appliance manufacture at little or no additional cost since these components are relatively inexpensive.

As the connector 231 is not isolated, it is important to protect operators of the appliance 100 against accidental shock and electrocution, in addition to complying with various international government safety standards for electrical equipment. Therefore, according to another aspect, the cavity 230 is covered by a plate or cover 235. Plate 235 can be made of plastic or metal. The plate 235 also seals off the cavity 231 from the appliance operator or user. The plate 235 can be formed with a perforated, partially cut, or scored edge that allows the plate 235 to be broken away or detached from the wall of the appliance 100 with the use of a tool, for example, a knife or screw driver. In this case, the operator must make a conscious effort to remove the plate 235, thereby limiting the chance of accidental exposure to the connector 231.

After the plate 235 is detached from the wall, the communications module 300 can be inserted into the cavity 230. According to one exemplary embodiment, the cavity 230 has appropriate dimensions such that once the communications module 300 is inserted into the cavity 230, the module 300 provides a flush mount with the outer wall of the appliance 100. The communications module 300 and cavity 230 can also include a snap connector, for example, such that once the communications module 300 is inserted into the cavity 230, the module snaps into place and is held in the cavity 230. Of course, one skilled in the art will appreciate that other types of devices can be used to secure the communications module 300 in the cavity 230. In addition, upon insertion the communications module 300 also couples with the connector 231. As a result, the module may be easily installed by a consumer after market without special tools or knowledge. After the communication module 300 has been inserted into the cavity 230, the module 300 prevents an operator or user from making contact with the connector 231 thereby protecting a user from accidentally contacting the connector 231.

According to an alternative embodiment, the plate 235 can be attached to the frame of the housing, such as with a screw, a snap, a latch, a lock, a hinge, or other means of securing the plate, allowing removal of the plate 235 by the user (preferably with the use of a tool). The plate 235 can then be reattached, repositioned, or replaced once the communications module 300 has been inserted into the cavity 230. The repositioned cover 235 can seal or hold the module 300 within the cavity 230.

Communications Modules

Figure 3A:
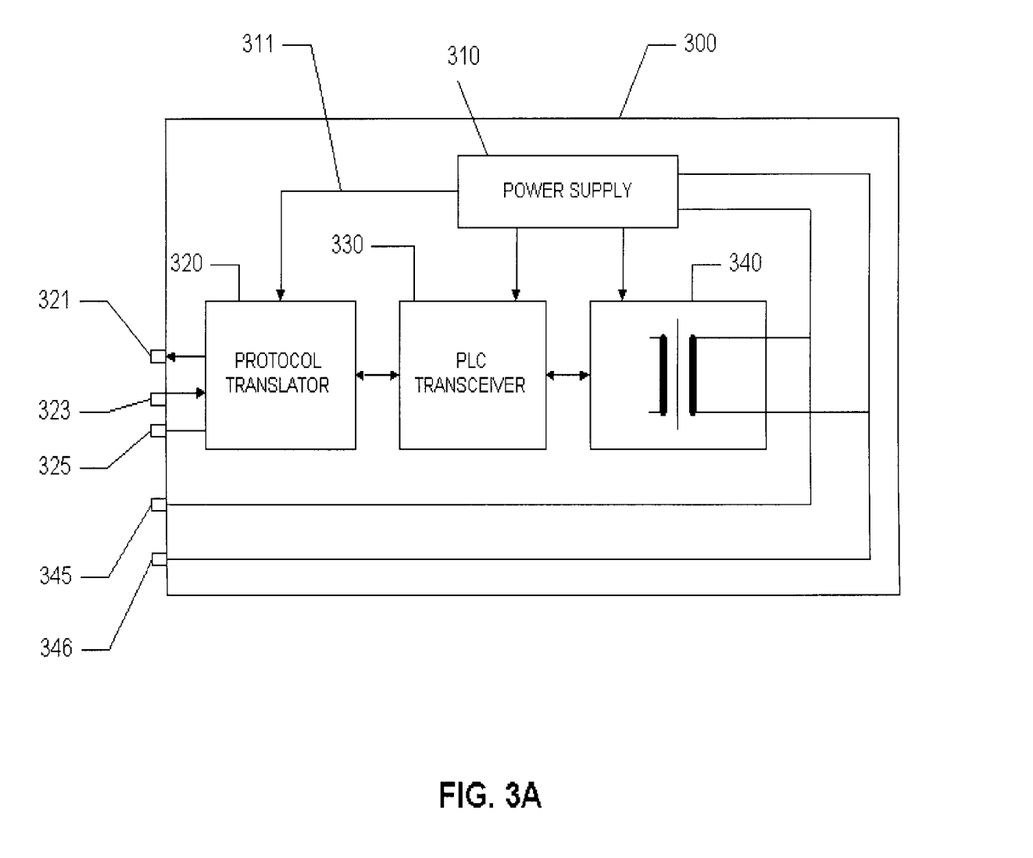
FIGS. 3A–3D show exemplary block diagrams of a communications module according to several alternative embodiments.
Figure 3B:
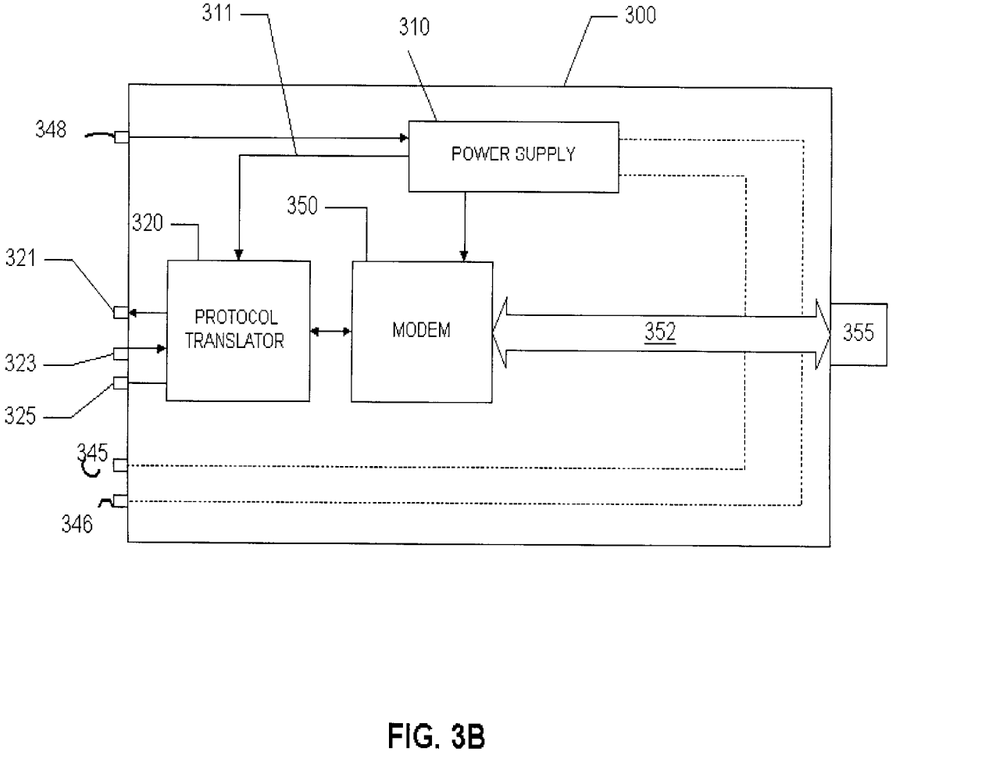

Turning to FIG. 3A, an exemplary embodiment of a communications module 300 is shown in further detail. The communications module 300 provides an interface between an appliance electronic control system and a communications media thereby enabling an appliance to be networked with other appliances and equipment.

The communications module 300 has an outer housing, for example, made of plastic (class II) or metal (class I) providing an insulation voltage of 3750V, for example. According to one embodiment, the communications module 300 may include raised portions (not shown) on the sides that slide or snap into corresponding slots within the cavity 230 (or housing) of the appliance 100 thereby securing the communications module 300 within the cavity 230. A button or other mechanism can be provided to release the module 300 and allow removal of the module 300 as is known to those skilled in the art. Alternatively, a slot can be provided for insertion of a tool, such as a screwdriver, after the communications module 300 has been inserted into the cavity to remove the communications module 300.

The communications module 300 includes a power supply 310 for supplying power to a protocol translator 320, a Power Line Communication (PLC) transceiver 330, and a line driver 340. The power supply 310 can, according to an exemplary embodiment, power the communications module components (320, 330, 340) by converting the appliance voltage supplying a voltage range of 100V to 264V and 50/60 Hz on a live wire (219 or 221 shown in FIG. 2) to the connector 231 to a DC voltage to be used by the communications module components (320, 330, 340). The power supply 310 receives power from the connector 231 via pins 345 and 346.

The protocol translator 320 is connected to a transmit line, a receive line, and a ground line connected to pins 321, 323, and 325, respectively. The pins mate with the connector 231 when the module 300 is inserted in the cavity 230. Pin 321 connects with transmit line 215 via connector 231. Pin 323 connects with the transmit line 212 via the connector 231, and pin 325 connects with a ground on the connector 231. FIG. 4C shows an example of this pin connection. Collectively at least pins 321, 323, and 325 can form the module I/O connector. Additionally, pins 345 and 346 can be included in the I/O connector. The I/O connector mates with the connector 231, for example.

The protocol translator 320 includes a processor (e.g., an ASIC, DSP, microprocessor, microcomputer) and memory (such as an IC or flash memory). The protocol translator 320 provides bi-directional communication by translating between a communications media protocol and the appliance control protocol. The protocol translator 320 receives signals from the appliance controller 201 and translates them into signals for transmission on a communications media. In addition, once the communications module is connected to a communications media, such as the bus, it could be programmed to automatically detect which communications protocol is necessary to communicate with the bus from the signals received on the bus from the signals received on the bus.

The appliance control signals arrive at the connector 231 from the appliance controller 201. The appliance control signals are translated into a network communications protocol by the protocol translator 320. The translated signals are sent to the PLC transceiver 330 were signals are coded for PLC transmission. The PLC transceiver operates a line driver 340. The line driver 340 places the translated appliance control signals as PLC coded signals on lines 345 and 346 according to a network protocol.

The PLC coded signals are then supplied by the connector 231 to the appliance power supply 220 by one of two alternative routes. For example, the connection lines to the appliance controller 201 (217 and 219) and the connection lines from the appliance controller to the power supply 220 (225 and 227) provide one route that can be used to send the PLC coded signals from the appliance to the network using a power line. Alternatively, the PLC signals can be sent directly to the power supply 220 through lines 222 and 221. The PLC signals are then sent from the appliance power supply 220 to the external power circuit (e.g., 104) supplying power to the appliance power supply 220. A host monitors to the external power circuit to receive the PLC coded signals, as shown for example in FIG. 1B. In this way, the host can monitor appliances connected to the external power circuit and the appliance can exchange data with the host or other appliances connected to the network.

PLC signals sent from the network can also be received by the appliance. PLC signals are received by the communications module 300 at pins 345 and 346. The PLC signals arrive at the line driver 340 and are decoded by the PLC transceiver 330 and are supplied by to the protocol translator 320. The protocol translator translates the received signals from the bus protocol into the format used by appliance controller 201. The formatted signals are then transmit on line 215 from pin 321 to the appliance controller 201.

Examples of bus and network protocols that may be translated by the communications module 300 are EMIT, EHS, EIB, KNX, LonWorks, and Bluetooth, among others. According to this configuration, data transfer between the appliance controller 201 and the communications module 300 can be carried out at 2400 bps, for example. Of course, other bit rates may be supported. In addition, new protocols can be downloaded to the memory of the communications module or a flash memory can be used to allow easy adaptation to new or alternative protocols. New protocols can also be downloaded from the network to the module via pins 345 and 346. According to one alternative embodiment, the module 300 can also be field or factory programmable allowing an installer to configure the module using the communications port (321, 323, and 325) to pick one of a plurality of protocols provided or to add a new protocol to a selection of standard protocols.

Other types of communication media can also be supported according to the invention. According to an alternative exemplary embodiment, as shown in FIG. 3B, a modem 350 can be provided within the communications module 300 to provide communication to a network via a phone line. Alternatively, a wireless modem could be used for remotely located appliances where phone lines may not be available. According to this exemplary embodiment, the protocol translator 320 handles modem dial-up to the network and provides buffering for the two-way data transfer on line 352. A phone line can be attached to the data transfer line 352 by adding a RJ connector 355 to the communications module 300. In addition, the protocol translator 320 could modify the data, if necessary, in cases where the remote host does not talk the same language as the appliance controller, for example. One skilled in the art will appreciate that the modem 350 does not have to be included within the communications module 300, but could be attached between the module 300 and a phone line 325.

As this embodiment uses a modem instead of PLC transmission, the power supply 310 can be supplied by a DC power feed from the appliance controller, for example. In this embodiment an additional pin 348 would be included and a DC power line would be connected from the appliance controller 201 to the connector 231. Alternatively, a power feed from 348 could be supplied directly to the translator 320 and the modem 350. According to another embodiment, lines 345 and 346 could be retained for supplying power to the modem 350 and translator 320 via power supply 310.

Figure 3C:
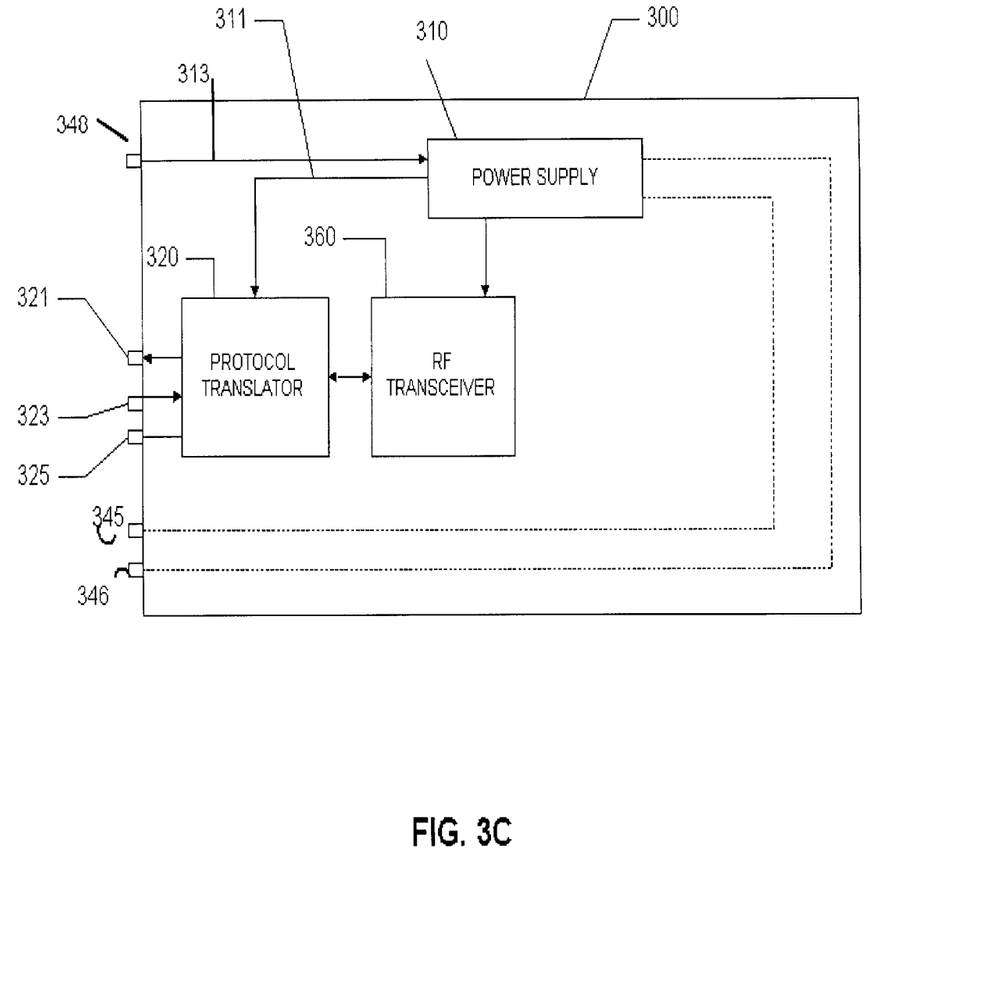

According to yet another exemplary embodiment as shown in FIG. 3C, a Radio Frequency transceiver 360 could be provided in the communications module 300 to allow for RF transmission and reception of data to and from a network. This exemplary embodiment allows for easy retrofitting in established homes or installations by allowing a network to be set up without the need for installing costly wiring for data communication. Alternatively, the RF transceiver 360 could be provided outside of the communications module and attached to the communications module 300. As embodiments described with reference to FIG. 3B indicate, DC power could be provided directly from the appliance controller via pin 348 or power could be supplied through lines 345 and 346 as described in the embodiment shown in FIG. 3A.

Figure 3D:
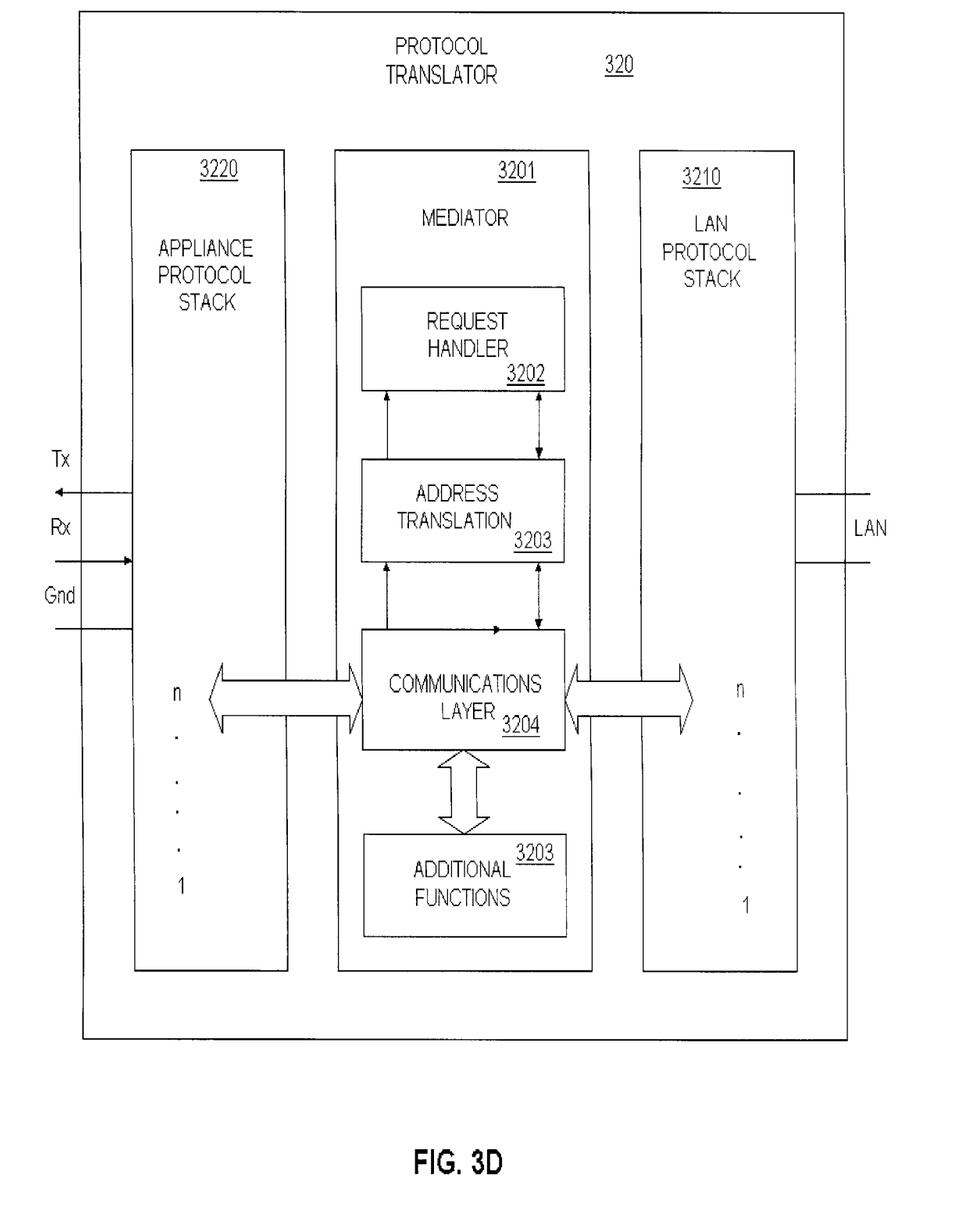

Turning to FIG. 3D an exemplary implementation of the protocol translator 320 is shown. The protocol translator 320 includes an appliance control stack 3220, a mediator 3201, and a LAN protocol stack 3210. The appliance protocol stack (APS) 3220 is a self contained multilevel software able to communicate with the appliance controller. The APS 3220 has inputs for transmit, receive, and ground (which in the embodiments shown in FIGS. 3A–3C are connected to pins 321, 323, and 325 of the communications module 300). The LAN protocol stack (LPS) 3210 is implement in software and is able to communicate with other devices connected to the LAN using 1 to n layers of the 7 layer OSI model. The mediator 3201 can be implemented by an intermediate software layer between the APS 3220 and LPS. The mediator 3201 forwards requests 3202 from the LAN to the appliance controller 201. The mediator 3201 also forwards requests 3202 from the appliance controller 201 to the LAN. The mediator 3201 also performs reference (address) translation 3203 of objects exposed to and accessed from the LAN. The mediator 3201 also supports handshaking and buffering 3203 between the appliance controller 201 and the LAN. Therefore, any number of appliance protocols and network protocols can be handle by a single communication module allowing an appliance to be adapted to the network of choice. Additionally, connectivity to different networks or protocols can be made simply by replacing the module or reconfiguring the existing module.

Connector Configurations

Figure 4A:
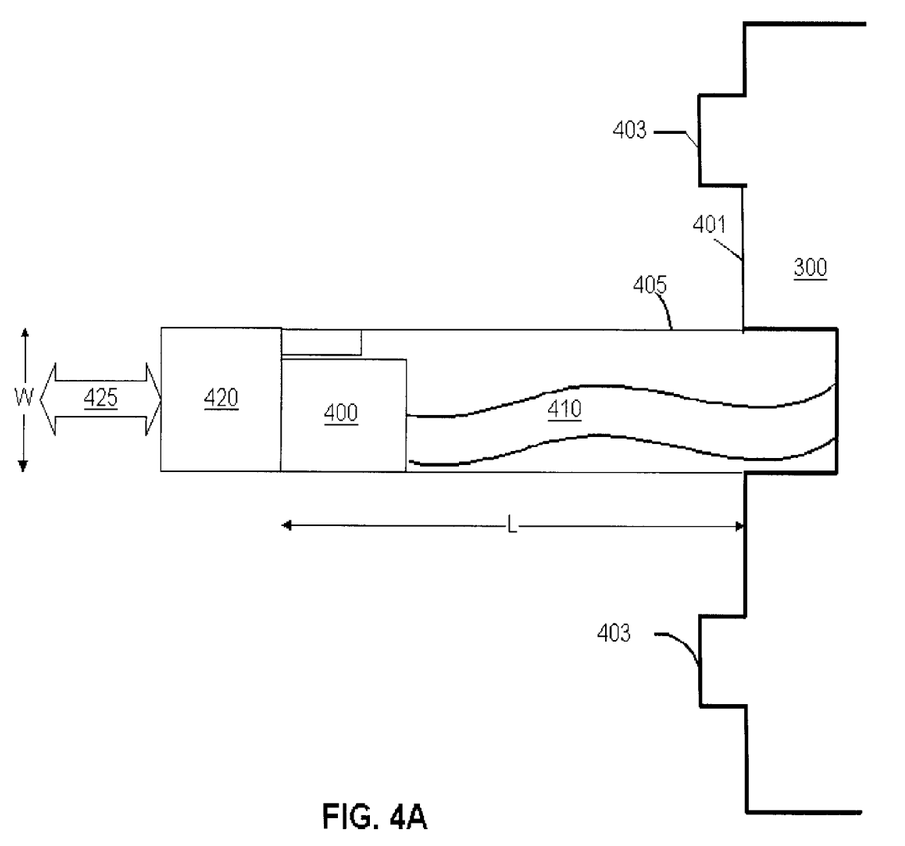
FIGS. 4A–4C show exemplary embodiments of a connector according to one aspect of the invention.

Another aspect of the invention is illustrated by FIG. 4A in which an alternative connector arrangement is shown. According to this exemplary embodiment, a communications module 300 may be surface mounted on a wall 401 of the appliance 100 using mounts 403, for example. The communications module 300 is provided with a connector jack 400 that reaches into the appliance. The connector jack 400 may be a male RJ-11 or RJ-45 connector, for example. As shown in FIG. 4A, a cavity 405 is provided in the wall 401 of an appliance 100. At the base of the cavity 405, a connector 420 is provided which is connected to the communications line 425. In this instance, the connector 420 would have the same functionality as connector 231. The communications line 425 is connected to the appliance controller for data transfer between the appliance controller 201 and the communications module 300. The connector 420 can be implemented using a female RJ-11 or RJ-45 connector, for example. According to an aspect of this embodiment, the cavity 405 has a length L and width W such that 8 mm creepage and clearance to any part of a body of the person using the equipment is provided. Creepage is defined as the surface distance and clearance is measured through the air. Essentially the dimensions provide sufficient length that would prevent an operator from accidentally contacting the connector (420 or 231) using his hands or fingers.

Figure 4B:
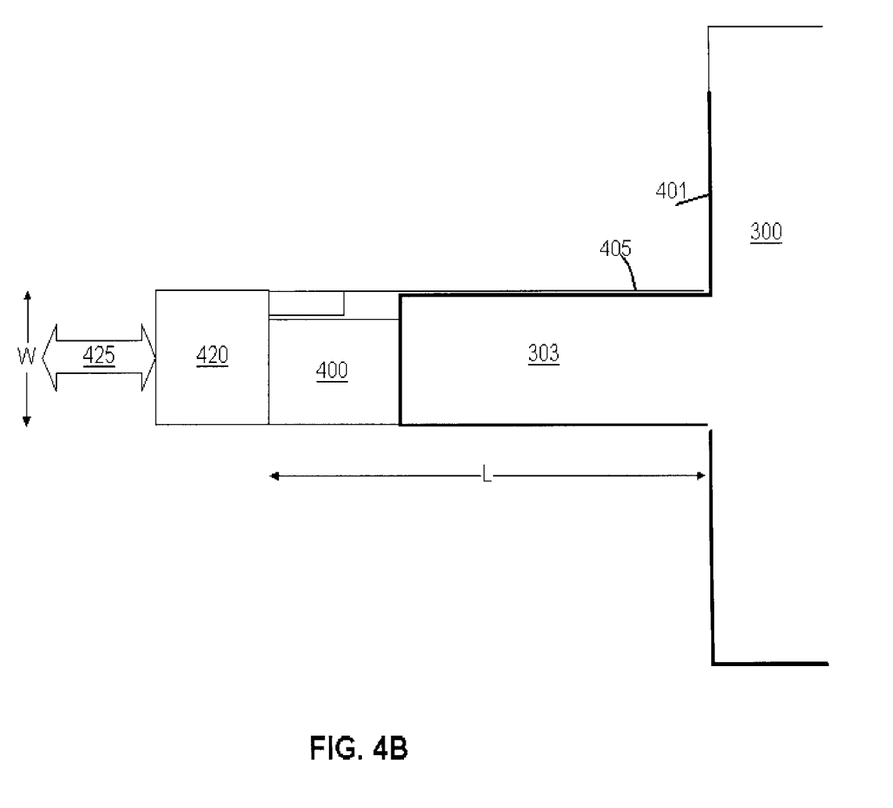
Figure 4C:
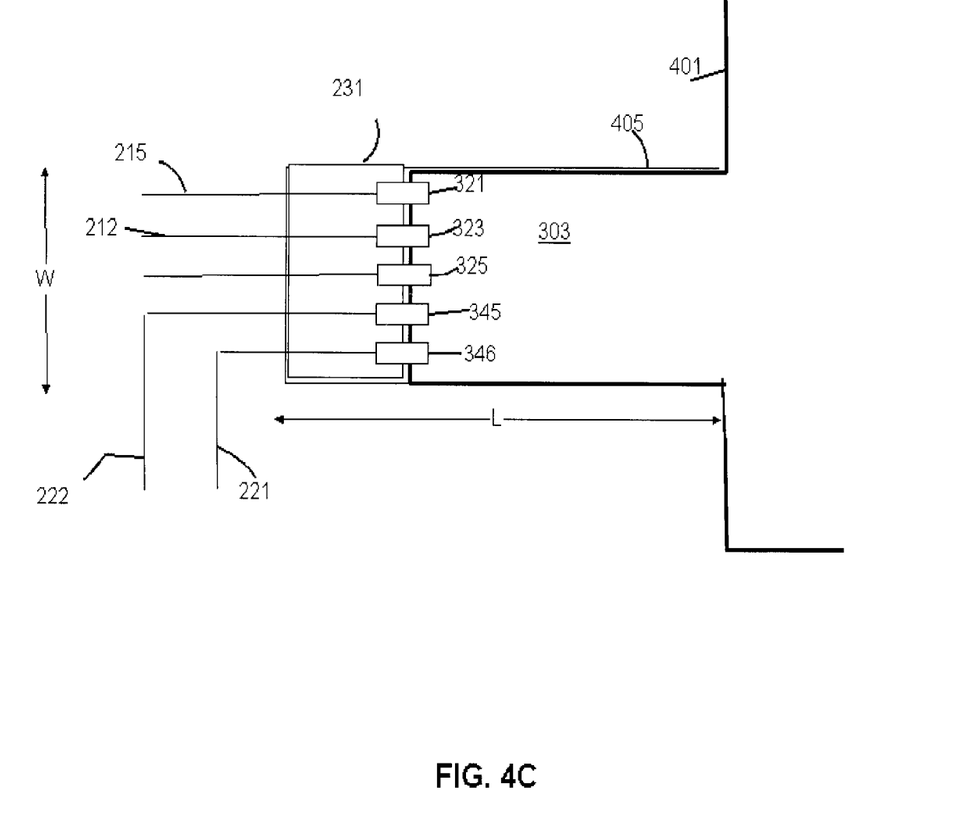

According to this embodiment, the communications module 300, mounts onto the wall 401 of the appliance. Before mounting, the connector 400 is inserted into the cavity 405 for mating with the appliance connector 420. The connector 400 is attached to a communication line 410 connects with protocol translator 320 of the communications module 300. Once inserted, the connector 400 cannot be removed without the use of a tool such as a screwdriver, for example. One skilled in the art will appreciate, that this type of connector could be configured for use in the side the cavity 230 in place of connector 231. In addition, other connectors (RJ or otherwise) may also be used according to this embodiment. Another alternative embodiment is shown in FIG. 4B. In this embodiment a stem 303 is provided extending from the communications module 300. The stem 303 ends in connector 400 for mating with connector 420. The module 300 may be surface mounted as described above. The stem 303 is inserted into the cavity 405 until it mates connector 400 with connector 420.

Turning to FIG. 4C and alternative embodiment is show for the connector 231. In this embodiment the stem 303 is provided with pins 321, 323, 325, 345, and 346. The stem 303 is inserted into cavity 405 until the pins mate with the connector 231. The configuration shown could also be supplied in the cavity 230 shown in FIG. 2 as an alternative to the connector configuration shown there. Additionally, the connectors in 4A–4C could be provided instead of including a plate 235 allowing the cavity to be exposed until a communication module 300 is inserted.

According to the various exemplary embodiments provided, manufactures can produce network ready appliances with little or no change to current production design. At a minimum, all that would be needed to produce a network ready appliance is a communications line from a communications port in the appliance controller to the cavity, or mount, for the communications module. In this case, all that is required to connect the appliance to a network is installation of the communications module. Unlike other systems, the exemplary embodiments provided herein, add little or no cost to the production of an appliance since no expensive isolators are required between the appliance controller and communications module. In addition, the integrated connector and communications module allow for easy retrofit assembly without the need for tools or configuration. As a result, the module can be easily and safely installed by consumers, in addition to trained technicians. Also, installation of the communications module can be performed after market.

Once installed, the appliance can be easily adapted to whatever communications protocol is in use at the appliance's location by simply inserting the appropriate communications module. Furthermore, communications protocols can be easily switched by replacing the module or reconfiguring the module by downloading new software, for example. As a result, manufactures do not have to worry about designing the appliance to be compliant with any particular communication protocol. Also, the communications module can be adapted or replaced to accommodate newer or different communications protocols not currently supported by the module without having to replace the appliance or perform costly modifications. Finally, as the communications modules can be easily installed with little or no overhead, they can be quickly and installed by the manufactures when appliances are ordered or produced to comply with the purchaser's specifications.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A communications module adapted to be received by an appliance having an appliance controller, said module comprising:
    a module input/output (I/O) connector; and
    a communications protocol translator connected to said I/O connector;
    wherein said communications protocol translator translates signals received from said I/O connector into appliance controller signals to be output to said appliance controller and translates appliance control signals received from said I/O connector according to a communications protocol to be output on said I/O connector.

2. The communications module of claim 1 further comprising:
    a power line transceiver connected to said communications protocol translator; and
    a power line driver connected to said transceiver and said I/O connector,
    wherein said appliance control signals translated according to said communications protocol are output from said protocol translator to said power line transceiver to operate said line driver to send the translated signals as power line carrier signals to a network.

3. The communications module of claim 1 wherein said I/O connector is adapted to be electrically coupled with an appliance power supply.

4. The communications module of claim 1 further comprising a second I/O connector and a modem connected to said protocol translator and said second I/O connector wherein said signals translated according to said communications protocol are output from said protocol translator to said modem for transmission to a network through said second I/O connector.

5. The communications module of claim 1 further comprising a radio frequency transceiver connected to said protocol translator wherein said signals translated according to said communications protocol are output from said protocol translator to said RF transceiver for transmission to an RF network.

6. The communications module of claim 1 wherein the protocol translator provides translation for at least one of EMIT, EHS, EIB, KNX, LonWorks, and Bluetooth communication protocols.

7. A network ready appliance comprising:
    an appliance controller including a communications port;
    a cavity, defined by a plurality of walls, adapted to receive a communications module;
    an opening in a wall of the appliance providing access to said cavity;
    a connector attached to one of said plurality of cavity walls;
    a communications line connecting said communications port and said connector, and
    a power supply,
    wherein said connector is electrically coupled to said appliance power supply.

8. The network ready appliance of claim 7 further comprising a detachable cover provided over said opening.

9. The network ready appliance of claim 8 wherein said detachable cover is attached to a wall of said appliance and is outlined by one of perforations or scoring and wherein said cover can be detached from the wall by breaking said cover away from the wall.

10. The network ready appliance of claim 8 wherein said cover requires a tool to facilitate removal of said cover over said cavity.

11. The network ready appliance of claim 7 wherein said opening is sealed upon placement of said communications module in said cavity.

12. The network ready appliance of claim 7 further comprising a communications module connected to said connector attached to one of the cavity walls, said communications module including:
   a communications protocol translator connected to said connector;
   wherein said communications protocol translator translates signals received from said connector into appliance controller signals to be output via said connector to said appliance controller and translates appliance control signals received from said connector according to a communications protocol to be output to a power line via said connector.

13. The networked appliance according to claim 12 wherein said module further includes
   a power line transceiver connected to said communications protocol translator; and
   a power line driver connected to said transceiver and said connector, wherein said signals translated according to said communications protocol are output from said protocol translator to said power line transceiver to operate said line driver to send the translated signals to a network as power line carrier signals via said connector and the appliance power supply.

14. The network ready appliance according to claim 7, wherein said connector is recessed in a second cavity.

15. A network ready appliance comprising:
   a housing having a wall;
   a cavity adapted to receive a communications module mounted on said wall;
   an opening in said wall providing access to said cavity; and
   a connector recessed in said cavity and connected to the base of said cavity,
   wherein said connector is adapted to receive a connector of said communications module when said communication module is mounted on said wall thereby sealing said cavity and said recessed connector.

16. A network ready appliance according to claim 15, wherein said appliance further comprises:
   an appliance controller; and
   a communication line connecting said appliance controller to said recessed connector.

17. A network ready appliance according to claim 16, further comprising said communications module mounted on said wall, said module including a communications protocol translator connected to said recessed connector, wherein said communications protocol translator translates signals received from said recessed connector into appliance controller signals to be output via said recessed connector to said appliance controller and translates appliance control signals received from said recessed connector according to the communications protocol to be output to a power supply via said via said recessed connector.

18. A network ready appliance according to claim 17 wherein said module includes a connector attached a communications line that is inserted into said cavity to mate with said recessed connector.

19. A network ready appliance according to claim 18 wherein said module further includes a stem containing said module connector and communications line and wherein said stem is inserted into said cavity to mate said module connector and said recessed connector.

* * * * *